United States Patent [19]

Koslow et al.

[11] 4,163,657
[45] Aug. 7, 1979

[54] SOIL CONDITIONING COMPOSITION AND METHOD OF USING SAME

[75] Inventors: Evan E. Koslow, Westport, Conn.; J. Samuel Batchelder, Katonah, N.Y.

[73] Assignee: Koslow-Batchelder Technologies, New Haven, Conn.

[21] Appl. No.: 918,335

[22] Filed: Jun. 23, 1978

[51] Int. Cl.² ............................................. C05F 11/00
[52] U.S. Cl. ..................................... 71/27; 71/64 SC
[58] Field of Search ............... 47/DIG. 10, 58; 71/27, 71/28, 29, 64 SC

[56] References Cited

U.S. PATENT DOCUMENTS

| | | | |
|---|---|---|---|
| 2,625,529 | 1/1953 | Hedrick et al. | 71/64 SC |
| 3,029,140 | 4/1962 | Hemwall | 71/27 X |
| 3,051,563 | 8/1962 | Bersworth | 71/27 X |
| 3,798,838 | 3/1974 | Hashimoto et al. | 47/DIG. 10 |
| 3,831,317 | 8/1974 | Porte | 47/DIG. 10 |
| 3,954,436 | 5/1976 | Vad et al. | 71/27 |

FOREIGN PATENT DOCUMENTS 768605 12/1971 France ........................................ 71/27
47-2528 1/1972 Japan .

*Primary Examiner*—Kenneth M. Schor
*Attorney, Agent, or Firm*—James & Franklin

[57] ABSTRACT

A soil conditioning composition of extended useful life in soil comprises a substantially linear, substantially water-soluble hydrophilic polymer having a molecular weight greater than 50,000 and at least one functional group disposed along the polymer chain. The polymer chain comprises one or more polymer chain segments characterized by an absence of the functional group therein and a minimum length, the minimum length of the polymer chain segment being at least one micrometer when the polymer chain segment is secured to one of the functional groups only at one end thereof and at least two micrometers when the polymer chain segment is secured to a respective one of the functional groups at each end thereof. The functional group is more capable of attaching the polymer to a solid soil phase than is the polymer chain segment, whereby the polymer includes at least one portion adapted to secure the polymer to a solid soil phase and at least one portion adapted to extend into an aqueous soil phase.

29 Claims, 2 Drawing Figures

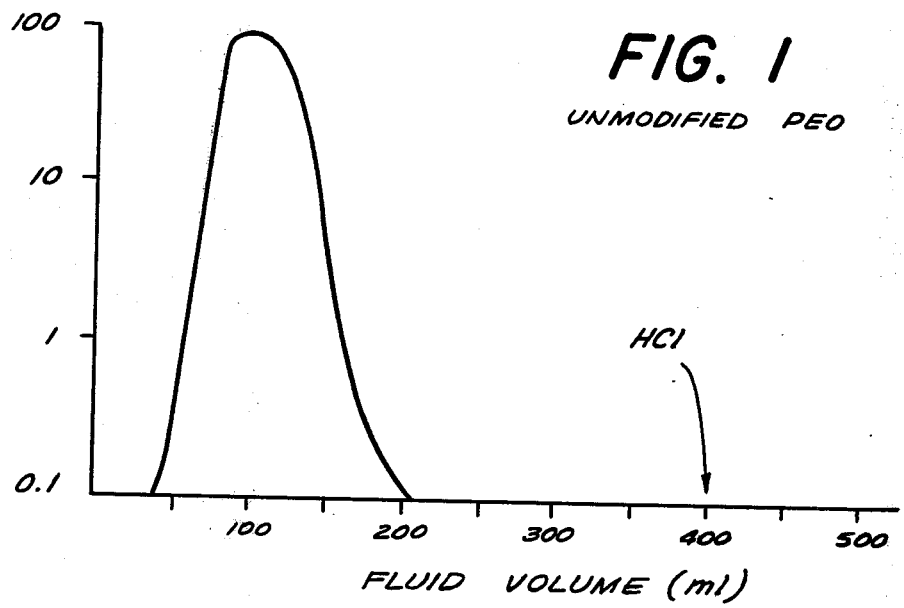
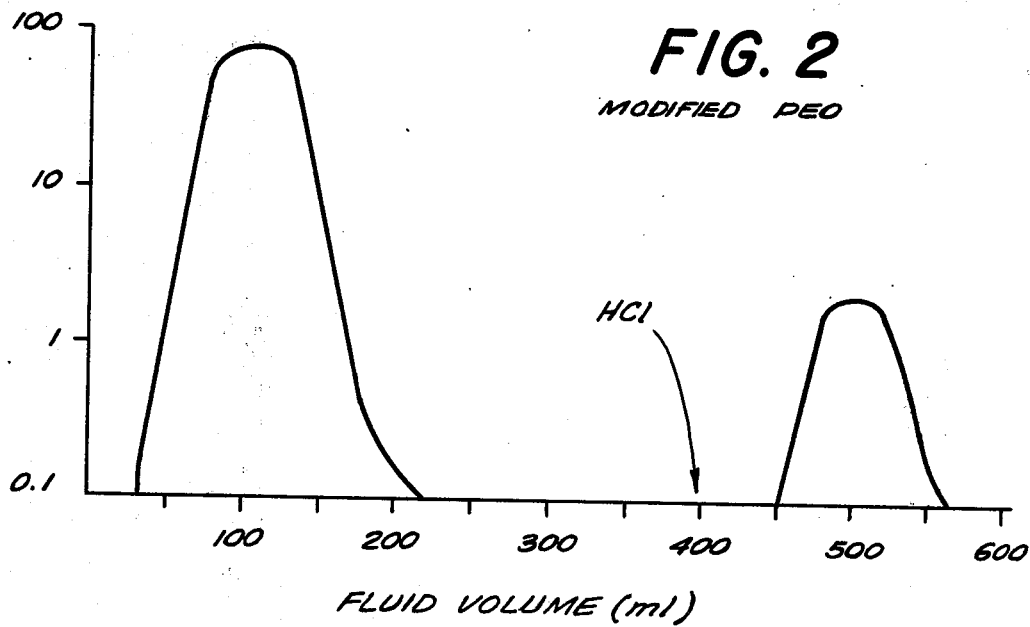

SOIL CONDITIONING COMPOSITION AND METHOD OF USING SAME

BACKGROUND OF THE INVENTION

The present invention relates to a soil conditioning composition and a method of using same, and more particularly to an improved soil conditioning composition having an extended useful life in soil.

The use of organic mulches to create a protective covering over soil, thereby to reduce the evaporation loss of moisture from the soil, is well known. Typical of these organic mulches are loose, chopped, pulverized or shredded organic materials such as wood chips, hay, grass clippings or sawdust. More recently "plastic mulches" have been used, these being several mil thick sheets of plastic (for example, high molecular weight polyethylene) which are placed over the soil for the same purpose. Typically the plastic mulches are provided with apertures allowing for the planting of crops from above and the penetration of growing crops from below. An alternative to the use of the organic and plastic mulches which are placed on top of the soil has been the use of "super-slurper" polymers. These are usually water-insoluble, cross-linked, hydrophilic polymers that swell when in contact with water to absorb 10 to 30 times their weight in moisture. The water-insoluble polymers are placed in the soil and retain large amounts of soil water without influencing the physical properties of the water or the soil-water/soil-matrix interaction.

An alternative to use of the above-mentioned mulches has been the use of water-soluble polymers placed in the soil. When placed within the soil environment, these water-soluble materials dramatically alter the flow of moisture through the soil and increase water retention. Among the water-soluble polymers utilized for this purpose are high molecular weight poly (ethylene oxide), polyvinyl alcohol, polyvinyl pyrrolidone and polyacrylamide (whether hydrolyzed or not). The use of these polymers is suggested in such patents as U.S. Pat. Nos. 3,633,310; 3,798,838; 3,909,228; and Japanese Pat. No. 47-2528 (1972). It will be appreciated that these linear, water-soluble, hydrophilic polymer mulches directly control the physical properties of the soil water by modifying its viscosity, surface tension, and contact angle, and hence act in an entirely different manner than the cross-linked, water insoluble, hydrophilic "super-slurper" polymers or polymers used to aggregate soil particles. They are particularly useful in increasing the retention of water by coarse-textured soils through reducing evaporated and deep percolation.

The linear, water-soluble polymers have not proven to be entirely satisfactory in use as the residence time of these polymers tends to be very short when applied to natural soils and under the conditions prevalent in a natural environment. Despite their functional attractiveness, the tendency of these polymers to washout (that is, be removed from their area of utility within the soil) has made them economically unattractive as they must be constantly replaced in order to maintain them at the desired functional level.

Accordingly, it is an object of the present invention to provide a soil conditioning composition composed of a linear, water-soluble, hydrophilic polymer characterized by a low washout rate from soil.

It is another object to provide such a composition which will remain in the soil for a long period of time, thereby rendering the composition more cost-effective.

A further object is to provide a method of irrigation utilizing such a composition.

SUMMARY OF THE INVENTION

It has now been found that the above and related objects of the present invention are obtained in a novel soil conditioning composition.

The novel soil conditioning composition comprsies a substantially linear, substantially water-soluble hydrophilic polymer having a molecular weight greater than 50,000 and at least one functional group disposed along the polymer chain. The polymer chain comprises one or more polymer chain segments characterized by an absence of the functional group therein and a minimum length, the minimum length of the polymer chain segment being at least one micrometer when the polymer chain segment is secured to one of the functional groups only at one end thereof and at least two micrometers when the polymer chain segment is secured to a respective one of the functional groups at each end thereof. The functional group is more capable of attaching the polymer to a solid soil phase than is the polymer chain segment, whereby the polymer includes at least one portion adapted to secure the polymer to a solid soil phase and at least one portion adapted to extend into an aqueous soil phase.

In a preferred embodiment, the polymer is selected from the group consisting of substituted cellulosics, substituted homopolymers of ethylene oxide, vinyl alcohol, vinylpyrrolidone, vinyl acetate, acrylic acid, oxyethylene lauryl ether, oxyethylene sorbitan monooleate, and acrylamide, and copolymers of the aforesaid monomers with one or more substituted comonomers. The polymer is preferably a substituted polyether, such as substituted poly (ethylene oxide). The functional group is selected from the group consisting of amines, amides, quaternary ammonium salts, sulfides, bisulfides, halides, cyanides and phosphates and is preferably, based on experiments to date, a halide.

The polymer chain segment preferably has a length of 50–250 micrometers.

The novel soil conditioning composition is employed in a method of retarding the loss of water from a water-permeable soil by contacting the soil with the soil conditioning composition and thereafter irrigating the soil at periodic intervals as required to maintain the water content of the soil. Preferably the soil is contacted with 5–2500 parts of the soil conditioning composition per million parts of soil by weight.

BRIEF DESCRIPTION OF THE DRAWING

FIG. 1 is a graph showing, for poly (ethylene oxide) of 300,000 molecular weight, the relative (normalized) polymer output from a tube as a function of the fluid volume passing through the tube, the arrow pointing to the point at which hydrochloric acid is introduced into the tube; and FIG. 2 is a graph similar to FIG. 1 except that the poly (ethylene oxide) has been modified to include functional groups according to the present invention.

DETAILED DESCRIPTION OF THE PREFERRED EMBODIMENTS

The soil conditioning composition of the present invention comprises essentially a substantially linear, substantially water-soluble, hydrophilic polymer having a molecular weight greater than 50,000 and at least one functional group disposed along the polymer chain. The polymer need not be completely linear as small amounts of branching which do not deleteriously affect the substantial water-solubility of the polymer are acceptable.

The polymer may be formed by appropriate substituting any of the polymers already recognized as useful in conditioning soil and increasing the water retention thereof —for example, the cellulosics (such as carboxymethylcellulose), and the homopolymers of ethylene oxide, vinyl alcohol, vinylpyrrolidone, vinyl acetate, acrylic acid, oxyethylene lauryl ether, oxyethylene sorbitan mono-oleate, and acrylamide (whether hydrolized or not). Alternatively, the polymer may be formed by copolymerizing one or more of the aforementioned monomers with one or more substituted comonomers (that is, comonomers containing the functional group) such as epichorohydrin. The substituted homopolymers of ethylene oxide (that is, substituted poly(ethylene oxide) and acrylamide (that is, substituted polyacrylamide) are preferred, with the substituted poly(ethylene oxide) being especially preferred for its ability to impart a maximum benefit to the soil using the smallest mass of material, its very low intrinsic mammalian toxicity, and its ready availability. Generally, the preferred substituted homopolymers are substituted polyethers.

The preferred functional groups are the amines, amides, quaternary ammonium salts, sulfides, bisulfides, halides, cyanides and phosphates. Based on experiments performed to date, halides are especially preferred. As the purpose of the functional group is to provide the polymer with a portion adapted to secure the polymer to an immobile solid soil phase, and there are a variety of different mechanisms which may be operating individually or jointly to bind the functional group to the solid soil phase, the aforementioned listing of functional groups should not be considered exhaustive. Among the mechanisms which may be operative in a given case are hydrogen bonding (promoted by the presence of highly polar groups or charge transfer groups at the binding sites), ligand exchange, ion exchange, chemisorption (involving actual chemical reaction between the polymer and the solid soil phase), van der Waal bonding (promoted by increasing molecular weight of the polymer), and London interactions. The London interactions are often called "hydrophobic bonding", and are promoted in aqueous systems with polymers having hydrophobic moieties such as long-chain saturated or unsaturated carbons, aromatics, etc., which interact with the hydrophobic organic matter present in the solid soil phase.

Thus the functional groups are typically hydrophobic groups, chemically reactive groups, highly polar groups or highly cationic groups (such as quaternary ammonium salts). A more complete exposition of the solid soil phase bonding mechanisms is found in "Organic Chemicals in the Soil Environment", Vol. 1, C. A. I. Goring and J. W. Hamaker, editors (Marcel Dekker Inc., New York 1972).

A critical feature of the present invention is that the polymer chain comprises one or more polymer chain segments characterized by an absence of the functional groups therein and a minimum length. Where the polymer chain segment is secured at only one of the ends thereof to one of the functional groups (with the other end thereof typically defining the end of the polymer chain), the minimum length is one micrometer. In this instance the functional group (which ordinarily, but not necessarily, would be at one end of the polymer chain) serves to anchor the polymer chain to the solid soil phase, with the polymer chain segment being free to enter into the aqueous soil phase. When the polymer chain segment is secured at each end thereof by a respective one of the functional groups, the minimum length is at least two micrometers. In this instance, the two functional groups secured to the polymer chain segment ends attach the ends to the solid soil phase and therefore the polymer chain segment must be twice the length described in the case of the polymer chain segment secured to a functional group adjacent only one end thereof, in order to enable the polymer chain segment to extend equally as far into the aqueous soil phase. Obviously a given polymer chain may include a mix of polymer chain segments comprised of one or more of the first type of polymer chain segments and/or one or more of the second type of polymer chain segments. In a preferred case, the polymer chain will have the functional groups disposed at one or both of the ends thereof. In this case, if there is only one functional group, then the polymer chain segment is of the first type; if there are two functional groups (one at either end of the polymer chain), then the polymer chain segment is of the second type.

It will be appreciated that functional groups may also be disposed immediately adjacent one another (e.g., as part of a block polymer) or separated by less than a one micrometer length of polymer chain; however, in the latter case, the portion of the polymer chain intermediate the two functional groups does not qualify as a polymer chain segment according to the present invention as it is incapable of extending sufficiently into the aqueous soil phase to enhance water retention and transport. Thus, the purpose of the spacing of the functional groups along the polymer chain is to insure that there is at least one portion of the polymer (namely, the functional group) adapted to secure the polymer to the solid soil phase and at least one portion (the part of the polymer chain intermediate a pair of functional groups or intermediate one function group and a chain end) adapted to extend into the aqueous soil phase. The desired length of the polymer chain segment is determined by such considerations as the size of the soil pores into which it will extend and, more particularly, the size of the soil pores which must be maintained in a moistened condition to prevent wilting. While these soil pore size considerations will vary from soil to soil, the prescribed polymer chain segment length is believed to meet the criterion for most natural soils.

Preferably each polymer chain segment has a length of about 50–250 micrometers, although even longer polymer chain segments are useful as well.

The composition of the present invention is used to retard the loss of water from a water-permeable soil by contacting the soil with the soil conditioning agent and thereafter irrigating the soil at periodic intervals as required to maintain the water content of the soil. The soil conditioning composition may be intimately mixed with the soil, but is most easily applied merely as a water solution.

The soil conditioning composition not only retards water loss (e.g., from evaporation or deep percolation), but generally improves the water-holding capacity of the soil and promotes the transport of water and water-carried nutrients to the soil. Occasional additions of the composition may be used to replace the portions lost by natural processes to maintain the desired composition concentration in the soil.

Generally about 5–2500 parts of the soil conditioning composition are used per million parts of the dry soil by weight, preferably about 5–500 parts (corresponding to 10–1,000 lbs. per acre). Within the ranges provided, no deleterious effects are noted and the amount of polymer to be used will depend upon a cost analysis involving the price of the soil conditioning agent and the increment in the value of the crop produced through use of the soil conditioning agent.

The substituted polymers of the present invention may be synthesized by techniques well recognized by those skilled in the art. For example, poly (ethylene oxide) substituted with chlorine may be produced by dissolving poly (ethylene oxide) homopolymer in pyridine and reacting the solution with phosphorus trichloride ($PCl_3$). The resulting product is dried, dissolved in distilled water, filtered through qualitative filter paper, and extracted in chloroform. The extract is then dried and optionally redissolved in distilled water. The resultant product contains about 3% of the substituted polymer (i.e., poly (ethylene oxide) with one or two chlorine end groups), the remainder being unsubstituted polymer (i.e., poly (ethylene oxide).

A preferred copolymer of the present invention may be formed by reacting a block polymer of epichlorohydrin with an alkyl epoxide to grow the long chain water-soluble polymer. The chloride groups of the block polymer are then further reacted (for example, with ammonia, alcohol, hydrogen cyanide, etc.) to yield the specific bonding site of choice (for example, amines, alkyl groups, or cyanides). It will be appreciated that the choice of monomers and co-monomers will be influenced by the need to maintain the resultant polymer water-soluble. Accordingly, while ethylene oxide may be utilized as the base monomer for the hompolymer or copolymer, the higher alkyl epoxides (such as propylene oxide) tend to be water-insoluble when homopolymerized and thus should be used only as a co-monomer to form the substituted copolymer of the present invention.

The following examples illustrate the efficiency of the present invention. All parts are by weight unless otherwise indicated.

EXAMPLE I

This example illustrates a method of producing a substituted poly (ethylene oxide) according to the present invention.

100 Ml of pyridine and 10 g of 300,000 MW PEO were mixed in an Erlenmeyer flask with ground glass stopper and solubilized with agitation over a two hour period. This solution was then placed in a 250 ml round bottom flask, and to this flask, a long (500 mm) condensor tube (without jacket), composed of low-actinic glass, was coupled via a ground glass coupling. 10 Ml of $PCl_3$ was added to the flask with a resultant increase in the viscosity of the solution. The solution was placed in a low-temperature environment (1°–3° C.) and allowed to gently reflux for 2.5 hours with the tube acting as an air cooled condensor.

At the end of the reflux period, the solution in the flask contained a granular orange precipitate. The contents of the flask were then transferred to a 250 ml beaker and dried in an oven at 95°–110° C. for 21 hours. After this time, there remained in the beaker a brown viscous fluid which was then dissolved in distilled water. (Upon the addition of water, the brown fluid became a hard plastic material and required some effort to dissolve). The resulting solution was filtered and yielded a clear filtrate with a slight orange tinge and slightly elevated viscosity.

This filtrate was placed in a separatory funnel and 35 ml of chloroform and 20 g of NaCl were added. Vigorous agitation followed by a prolonged period to obtain satisfactory separation of the emulsion produced a chloroform extract. This procedure was repeated. The combined extractions were then dried and the resulting residue dissolved in water. Extraction was again performed and the second residue dissolved in distilled water to produce the modified polymers containing about 3% modified PEO and 97% unmodified PEO.

EXAMPLE II

This example illustrates the comparative attachment of PEO and modified PEO to a soil substrate.

Stock solutions of PEO and the modified polymer (produced in Example I), both having molecular weight averages of 300,000, were prepared by boiling water and rapidly stirring in 2 grams of polymer with a whisk. These solutions were diluted with cold water and made to 1000 ml (2000 ppm). Two columns of soil were prepared by using buret tubes 6″ long (total 100 ml tube volume) and filled with 170 grams of a sandy loam dried for three months in air. The soil was added to distilled water-filled buret tubes to produce a fully saturated column. Distilled water was run through each column in 50 ml aliquots under gravitational potential. Subsequently, a 50 ml aliquot of polymer solution was passed through each column followed by many additional aliquots of distilled water to remove any polymer not firmly attached to the soil. Following this, a dilute solution of hydrochloric acid (one ml of concentrated HCl in 49 ml of water) was added to the soil to displace any polymer attached. The elution of the polymer from the column was monitored using the potassium ferrocyanide test.

The result of this experiment is shown in FIGS. 1 and 2, with the relative polymer output in each figure being normalized for the first peak. It can be clearly seen that a large quantity of polymer was removed by the acid from the tube treated with modified PEO while no polymer was removed by the acid from the tube treated with an equal quantity of unmodified PEO. The first peak in each of FIGS. 1 and 2 represents essentially the elution by water of unmodified PEO; the second peak in FIG. 2 represents the elution by hydrochloric acid of modified PEO that was attached to the solid soil phase but displaced by the acid treatment. Of the 3% modified PEO in the modified polymer, about 80% was initially retained in the tube after only a few minutes contact time and all of that was displaced by the acid treatment.

To summarize, the present invention provides a soil conditioning composition having an extended useful life in soil and hence an economic attractiveness not found in the prior soil conditioning compositions used for the same purposes. The compositions of the present invention are characterized by a low wash-out rate from soil, and hence a high level of cost-effectiveness.

As used herein, the term "irrigation" encompasses both natural irrigation (e.g., by rainfall) and artificial irrigation (e.g., by spraying), and the parts of soil conditioning composition to be used per part of soil is based on the weight of the soil after saturation to field capacity and draining.

Now that the preferred embodiments of the present invention have been shown and described in detail, various modifications and improvements thereon will be readily apparent to those skilled in the art. Accordingly, the spirit and scope of the present invention is to be limited only by the appended claims, and not by the foregoing disclosure.

We claim:

1. A soil conditioning composition comprising a substantially linear, substantially water-soluble hydrophilic polymer having a molecular weight greater than 50,000 and at least one functional group disposed along the polymer chain, said polymer chain comprising one or more polymer chain segments characterized by an absence of said functional group therein and a minimum length, said minimum length of the polymer chain segment being at least one micrometer when said polymer chain segment is secured to one of said functional groups only at one end thereof and at least two micrometers when said polymer chain segment is secured to a respective one of said functional groups at each end thereof, said functional group or groups being more capable of attaching said polymer to a solid soil phase than is said polymer chain segment and at least one of said functional groups being attached to the solid soil phase; whereby said polymer includes at least one portion adapted to secure said polymer to a solid soil phase and at least one portion adapted to extend into an aqueous soil phase.

2. The composition of claim 1 wherein said polymer is selected from the group consisting of substituted cellulosics, substituted homopolymers of ethylene oxide, vinyl alcohol, vinylpyrrolidone, vinyl acetate, acrylic acid, oxyethylene lauryl ether, oxyethylene sorbitan mono-oleate, and acrylamide, and copolymers of ethylene oxide, vinyl alcohol, vinylpyrrolidone, vinyl acetate, acrylic acid, oxyethylene, lauryl ether, oxyethylene sorbitan mono-oleate, and acrylamide with one or more substituted comonomers.

3. The composition of claim 2 wherein said polymer is substituted poly (ethylene oxide).

4. The composition of claim 1 wherein said polymer is a substituted polyether.

5. The composition of any of claims 1-4 wherein said functional group is selected from the group consisting of hydrophobic groups amines, amides, quaternary ammonium salts, sulfides, bisulfides, halides, cyanides and phosphates.

6. The composition of claim 5 wherein said functional groups are halides.

7. The composition of any of claims 1-4 wherein said polymer chain segment has a length of 50-250 micrometers.

8. The composition of claim 5 wherein said polymer chain segment has a length of 50-250 micrometers.

9. The composition of any of claims 1-4 wherein said polymer chain includes a polymer chain segment secured at only one end thereof to one of said functional groups.

10. The composition of claim 5 wherein said polymer chain includes a polymer chain segment secured at only one end thereof to one of said functional groups.

11. The composition of claim 7 wherein said polymer chain includes a polymer chain segment secured at only one end thereof to one of said functional groups.

12. The composition of any of claims 1-4 wherein said polymer chain includes a polymer chain segment secured at each end thereof to a respective one of said functional groups.

13. The composition of claim 5 wherein said polymer chain includes a polymer chain segment secured at each end thereof to a respective one of said functional groups.

14. The composition of claim 7 wherein said polymer chain includes a polymer chain segment secured at each end thereof to a respective one of said functional groups.

15. The method of retarding the loss of water from a water-permeable soil comrising the steps of:

(A) contacting said soil with a soil conditioning composition comprising a substantially linear, substantially water-soluble hydrophilic polymer having a molecular weight greater than 50,000 and at least one functional group disposed along the polymer chain, said polymer chain comprising one or more polymer chain segments characterized by an absence of said functional groups therein and a minimum length, said minimum length of said polymer chain segment being at least one micrometer when said polymer chain segment is secured to one of said functional groups only at one end thereof and at least two micrometers when said polymer chain segment is secured to a respective one of said functional groups at each end thereof, said functional group being more capable of attaching said polymer to a solid soil phase than is said polymer chain segment; whereby said polymer includes at least one portion adapted to secure said polymer to a solid soil phase and at least one portion adapted to extend into an aqueous soil phase; and (B) thereafter irrigating said soil at periodic intervals as required to maintain the water content of said soil.

16. The method of claim 15 wherein said soil is contacted with 5-2500 parts of said soil conditioning composition per million parts of soil by weight.

17. The method of claim 15 wherein said polymer is selected from the group consisting of substituted cellulosics, substituted homopolymers of ethylene oxide, vinyl alcohol, vinylpyrrolidone, vinyl acetate, acrylic acid, oxyeghylene lauryl ether, oxyethylene sorbitan mono-oleate, and acrylamide, and copolymers of ethylene oxide, vinyl alcohol, vinylpyrrolidone, vinyl acetate, acrylic acid, oxyethylene lauryl ether, oxyethylene sorbitan mono-oleate, and acrylamide with one or more substituted comonomers.

18. The method of claim 17 wherein said polymer is substituted poly (ethylene oxide).

19. The method of claim 15 wherein said polymer is a substituted polyether.

20. The method of any of claims 15-19 wherein said functional group is selected from the group consisting of hydrophobic groups amines, amides, quaternary ammonium salts, sulfides, bisulfides, halides, cyanides and phosphates.

21. The method of claim 20 wherein said functional groups are halides.

22. The method of any of claims 15-19 wherein said polymer chain segment has a length of 50-250 micrometers.

23. The method of claim 20 wherein said polymer chain segment has a length of 50-250 micrometers.

24. The method of any of claims 15-19 wherein said polymer chain includes a polymer chain segment secured at only one end thereof to one of said functional groups.

25. The method of claim 20 wherein said polymer chain includes a polymer chain segment secured at only one end thereof to one of said functional groups.

26. The method of claim 23 wherein said polymer chain includes a polymer chain segment secured at only one end thereof to one of said functional groups.

27. The method of any of claims 15-19 wherein said polymer chain includes a chain segment secured at each end thereof to a respective one of said functional groups.

28. The method of claim 20 wherein said polymer chain includes a chain segment secured at each end thereof to a respective one of said functional groups.

29. The method of claim 23 wherein said polymer chain includes a chain segment secured at each end thereof to a respective one of said functional groups.

* * * * *